US008695275B2

(12) United States Patent
Havrda et al.

(10) Patent No.: US 8,695,275 B2
(45) Date of Patent: Apr. 15, 2014

(54) SEED PELLETS AND SOILS FOR GROWING PLANTS

(75) Inventors: Jiri Havrda, Prague (CZ); Bart Andre Maria van Hulle, Sint Niklaas (BE)

(73) Assignee: Eurochem N.V. (BE)

( * ) Notice: Subject to any disclaimer, the term of this patent is extended or adjusted under 35 U.S.C. 154(b) by 1330 days.

(21) Appl. No.: 11/469,671

(22) Filed: Sep. 1, 2006

(65) Prior Publication Data

US 2007/0062331 A1     Mar. 22, 2007

Related U.S. Application Data

(63) Continuation of application No. PCT/EP2005/002265, filed on Mar. 1, 2005.

(30) Foreign Application Priority Data

Mar. 2, 2004  (EP) .................................. 04075687

(51) Int. Cl.
  *A01G 31/00*     (2006.01)
(52) U.S. Cl.
  USPC .......................................................... 47/59 S
(58) Field of Classification Search
  USPC ..................... 119/173; 47/59 S, 58.1 R, 57.6
  IPC ...................................................... A01G 31/00
  See application file for complete search history.

(56) References Cited

U.S. PATENT DOCUMENTS

| 3,342,577 | A | * | 9/1967 | Blouin et al. .................. 504/101 |
| 3,418,219 | A |   | 12/1968 | Fahlbusch ........................ 204/38 |
| 4,055,974 | A | * | 11/1977 | Jackson, Jr. ........................ 71/11 |
| 4,589,226 | A | * | 5/1986 | Stensaas ........................ 47/48.5 |
| 4,759,151 | A | * | 7/1988 | Gerber ............................ 47/57.6 |
| 4,767,441 | A | * | 8/1988 | Walker et al. .................. 504/117 |
| 4,779,376 | A | * | 10/1988 | Redenbaugh ................... 47/57.6 |
| 5,188,064 | A | * | 2/1993 | House ............................ 119/172 |
| 5,464,457 | A | * | 11/1995 | Winston et al. ............. 47/58.1 R |
| 6,206,947 | B1 | * | 3/2001 | Evans et al. ........................ 71/63 |
| 6,254,654 | B1 | * | 7/2001 | Van Barneveld .................... 71/8 |

(Continued)

FOREIGN PATENT DOCUMENTS

| CZ | 291 443 |   | 3/2003 |
| DE | 3117008 | A1 * | 11/1982 |
| GB | 1026499 |   | 4/1966 |
| GB | 1480067 |   | 7/1977 |

OTHER PUBLICATIONS

Machine translation of DE 3117008.*
English abstract of CZ 291 443.

*Primary Examiner* — Shadi Baniani
(74) *Attorney, Agent, or Firm* — McDermott Will & Emery LLP

(57) ABSTRACT

The invention relates to the field of seed germination and growing of plants. A composition comprising a clay, an inert material, optionally a fibrous material, and a fourth component is provided, characterized in that said fourth component comprises a cation selected from the group consisting of Al, Zr and Ti and an anion selected from the group consisting of oxyhydroxide, oxychloride, nitrate, sulfate, chloride, hydroxide and alkoxide, and wherein the concentration of said fourth component ranges from 0.1 to 70 percent by weight (w %), preferably 0.5-25 w %, more preferably 1-10 w %, of the total weight of the clay, the inert material, and optionally the fibrous material, together.

19 Claims, 4 Drawing Sheets

(56) References Cited

U.S. PATENT DOCUMENTS

| | | | |
|---|---|---|---|
| 7,202,404 B2 * | 4/2007 | Basarab et al. | 800/320.2 |
| 2002/0026659 A1 * | 2/2002 | Blowers et al. | 800/298 |
| 2004/0020114 A1 * | 2/2004 | Boehmer et al. | 47/57.6 |
| 2005/0175577 A1 * | 8/2005 | Jenkins et al. | 424/76.1 |
| 2006/0107589 A1 * | 5/2006 | Rubin | 47/59 S |
| 2007/0062113 A1 * | 3/2007 | Rubin et al. | 47/59 S |
| 2007/0196427 A1 * | 8/2007 | Jokinen et al. | 424/426 |
| 2008/0022940 A1 * | 1/2008 | Kirsch et al. | 119/173 |
| 2008/0029039 A1 * | 2/2008 | Jenkins | 119/173 |
| 2008/0251027 A1 * | 10/2008 | Kirsch et al. | 119/173 |
| 2009/0217882 A1 * | 9/2009 | Jenkins | 119/173 |

* cited by examiner

SEED PELLETS AND SOILS FOR GROWING PLANTS

RELATED APPLICATIONS

This application is a continuation of PCT application no. PCT/EP2005/002265, designating the United States and filed Mar. 1, 2005; which claims the benefit of the filing date of European application no. EP 04075687.6, filed Mar. 2, 2004; both of which are hereby incorporated herein by reference in their entirety.

FIELD OF THE INVENTION

The invention relates to the field of seed and plant production. More specifically, the invention pertains to compositions, such as seed pellets and soil, allowing for improved growth of a plant from seed.

BACKGROUND OF THE INVENTION

It is well known that the achievement of a high percentage rate of germination capacity, high speed of germination of seeds, and development of a healthy, strong bud are dependent on, inter alias the chemical composition, the biological, microbiological and physicochemical properties of the surrounding soil or another plant growth medium, or in the case of the pelletization of seeds, on the properties of the pellet.

There have been publications on the effects of different cations and anions on the stimulation of the germination capacity of seeds, such as $KNO_3$, ethylene glycol, and others. In addition, information about the effect of pH of the environment on the course of the germination capacity of seeds has been reported. The positive effect of chemical and biological protection of seeds against moulds, bacteria and viruses on the germination and development of the germ is also known for long.

The temperature and humidity of the environment of a seed are among the factors known to significantly influence the course of germination. Successful germination depends heavily on the sufficient supply of oxygen to the seed, and on the other hand, on the rapid elimination of the gaseous products of metabolism or chemical or biological reactions of bacterial origin.

Thus far, modifications of the properties of soils and pellets aimed at achieving sufficient humidity and oxygen supply, including the transport of gaseous products during the germination process, have been oriented in particular towards the preparation of new, or the modification of existing, raw material composition of the pelletization mixtures or soils. Pelletization mixtures typically comprise various types of organic or inorganic fibers, clays and inert inorganic materials, and contain also particles with internal open porosity. Other frequently used types of pelletization mixtures are various combinations of clays with inert raw materials without the addition of fibers. The combination of raw materials with different water sorption properties is often used to modify and adjust the overall capacity of the pellets to absorb water. The fibers, together with the other raw materials, form the texture of the pellet with open porosity, which determines, along with the water absorption rate of the pellet, the pellet's capacity for the transport of the gaseous phase. The mode of transport of the water by these pellets is determined by the gradual imbibition of water from the external surface of the pellet throughout its depth up to the seed. This is caused by the imbibition capacity of the particles contained in the raw materials, along with the capillary suction of water in the open pores of the pellet's structure. It is believed that the clay constituents of the pelletization mixture are responsible for the cohesion of particles contained in the raw materials during the pelletization of seeds. At the same time, clay constituents are added to increase the mechanical strength of a pellet after drying. Especially when using a mechanical type of sowing, the mechanical strength of seed pellets is important. Inorganic binders, such as gypsum, can be added to the composition of the pellet, to adjust the mechanical strength of the pellet. In other cases, various types of glues, most frequently cellulose-based glues such as carboxymethyl cellulose, are used. Experiments with the addition of polyacrylates, silicones, polyvinyl alcohol and other types of organic/polymeric substances have also been performed. The disadvantage of the use of these systems in agriculture and forestry can include the long-term stability of the said substances in nature. Excess application thereof may represent a high ecological burden for the nature.

To date, the pelletization of seed has been performed in most cases in pelletizers by adding water and pelletization mixture. A pelletizer refers to an industrial apparatus for the production of pellets. The raw material composition of the pelletization mixture, especially the content of clays and admixture of organic glues, controls the speed of pelletization of seeds and the yield of pellets of the required size after pelletization. It is well known that the pelletization process can be controlled by the size of the respective doses of the pelletization powder and water, by the time of pelletization per dose and by the speed of revolutions of the pelletizer. An important feature of this process is allowing sufficient time for the addition of water and pelletization mixture to achieve a sufficient soaking of the raw materials contained in the product with the water, especially in the case of clay materials, to achieve a binding of the particles of the mixture and the adhesion thereof to the seed surface or to a previously pelleted layer. The speed of mixing and adhesion is a limiting factor of the total pelletization time and homogeneity in the properties of pellets. Further, the pellet must be understood, for its manufacture and use according to the invention, to be of any suitable shape or form, e.g., a tablet, a strip or any other form suitable for transport and/or sowing of seeds.

Similar principles for the modification of properties of the pellets are used for the modification of soils. For example, the permeability of water and gases in heavy clay soil can be improved by the addition of inert raw materials (such as sand, ashes, diatomaceous earth, and others) or fibers (such as straw) to the clay soil. In contrast, the addition of clays, for example, may be used to increase the water absorption capacity in light sandy soils.

Known procedures for improving the properties of pellets and soils generally involve the combination of various types and relative proportions of fibrous materials, clays, and inert raw materials, with the potential addition of organic glues. Combinations of raw materials are used to control the final properties of the pellets and soils which, in turn, determine the transport of water and oxygen, or gas in general, by the pellet.

However, the production of pellets and soils according to existing methods is frequently hampered by the fact that improvement of one property is often associated with the impairment of another property. For example, the increase in the mechanical strength of the pellet by means of an increased content of clay in the mixture frequently results in the compaction and reduced open porosity of the pellet, thus causing an impairment of the conditions for the transport of the gaseous phase by the pellet and increased resistance of the pellet for the growth of the germ. Another example is the increased porosity of the pellet achieved by the increased content of fibers and porous particles of the inert raw material in the mixture. This modification can result in the increased absorption of water by the pellet, accompanied by the reduced germination capacity of the seeds, especially in humid climatic conditions with excess moisture. The increase in the mechanical strength of the pellet by the significant addition of, for example, carboxymethyl cellulose is frequently associated with the proneness of the pellet to the growth of moulds in humid environments. The modification of the mechanical strength and absorption properties of the pellets with respect to water achieved by adding e.g., polyacrylates, can be accompanied by the increased resistance of the pellet for the growth of the germ, given the stability and irreversible change of the dried polyacrylate in moist conditions.

SUMMARY

The invention overcomes most, if not all, of the aforementioned difficulties through the provision of a novel composition for producing pellets and soils of sufficient mechanical strength while the porous structure is maintained. A composition according to the invention comprises a clay, an inert material, optionally a fibrous material, and a fourth component, characterized in that said fourth component comprises a cation selected from the group consisting of Al, Zr and Ti and an anion selected from the group essentially consisting of oxyhydroxide, oxychloride, nitrate, sulfate, chloride, hydroxide and alkoxide. According to the invention, the concentration of said fourth component in a composition ranges from 0.1 to 70 w %, more preferably 0.5-25 w %, most preferably 1-10 w %, of the total weight of the clay, the inert material, and optionally the fibrous material, together. Preferably, a composition provided herein comprises 20-50 percent by weight (w %) clay, 0-70 w % fibrous material, 0.1-80 w % inert material and a fourth component. Examples of suitable fourth components are AlO(OH), also known as boehmite, $ZrO(Cl)_2$, aluminum isopropanolate, and alkoxides of Ti and Zr. For economical reasons, boehmite is preferred as a fourth component over the Zr- or Ti-containing components. Preferably, said fourth component, such as boehmite, is added within the range of 0.1 to 40 percent by weight in form of sol. The term sol as used herein refers to a stable colloidal dispersion of solid particles with a size of approximately 2-200 nm in a liquid dispersion medium.

Figure 1:
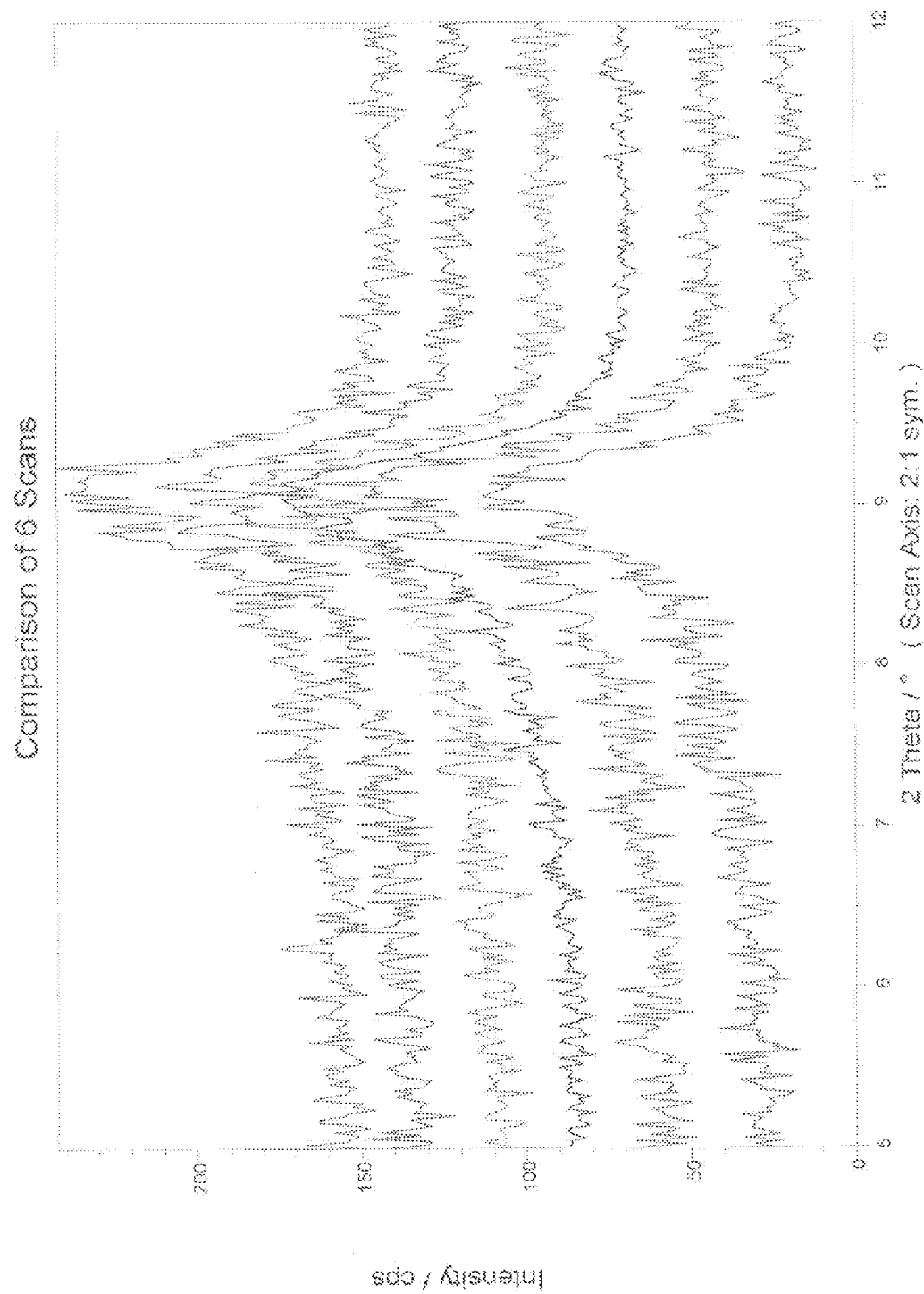
FIG. 1: X-ray diffraction patterns of powders particles of bentonite treated as described in example 7, except that drying proceeded at 60° C. after the homogenization of the particles.

Naked seeds were included as control. The germination capacity was evaluated after 3, 7 and 10 days under the conditions corresponding to approximately medium climatic conditions (35 mL of water, temperature 20° C.).

DETAIL DESCRIPTION OF THE INVENTION

A composition is preferably obtained via a controlled transformation of a fourth component in the sol form to the gel form. Sol-gel transformation processes in general have been known for a long time. They are often used for the chemical production of pure powders, such as alpha aluminum oxide, ceramic layers, and films on both metal and non-metal materials. In a preferred embodiment, the production of a composition according to the invention involves the controlled transformation of a sol of a fourth component, preferably AlO(OH) sol, to a gel. More preferred, said transformation is obtained by means of destabilization of the sol during the interaction with the raw material present in said composition. Sol-gel transformation, as the name implies, includes a gradual formation of a continual structure of dispersed particles through the formation of a colloid dispersion of solid particles in liquid (sol) and gelatization of the sol which most frequently results in a net in the continuous liquid phase (gel).

In a colloid, the particles are small enough and exhibit an electrical charge so that they will are uniformly dispersed in a medium, occupying the same relative position indefinitely, or until something happens to cause them to agglomerate into larger particles and settle or sediment. Examples of causes of agglomeration include pH changes or the addition of other chemicals. Colloids can be either liquid or solid. If a colloid behaves like a liquid at normal temperature conditions, it is considered to be a sol. If, at normal conditions, it does not flow like a liquid, and exhibits the properties of a solid or semi-solid, it is considered to be a gel.

The use of sol-gel transformation of AlO(OH) is known for the production of cutting grains based on $\alpha$-$Al_2O_3$. The procedures used for the preparation of aqueous dispersion of AlO(OH) (boehmite) involve its dispersion in water containing a peptization agent. The preparation of such an AlO(OH) sol means, in fact, the de-agglomeration of the original aggregates of particles of boehmite in acid environment, most frequently containing nitric acid. The transformation of sol to gel then is performed as a destabilization of the sol by means of the change in pH after adding monobasic and/or polybasic acids. During the following gelatinization process, the developing microstructure of the gel determines the final character of the particles of the final product $\alpha$-$Al_2O_3$, ceramic layers or films based on $\alpha$-$Al_2O_3$. The creation of primary particles in the dried gel (xerogel) proceeds differently in the presence or absence of nucleation germs. This difference is caused by the nucleation process, which shall proceed in the gel without nucleation germs. On the contrary, it may not proceed in the gel with nucleation germs added in the form of fine-grain $\alpha$-$Al_2O_3$ or crystallographically similar substances. Boehmite, obtained from many technologies, contains, in addition to trace quantities of admixtures, a certain portion of non-peptizable particles, which can serve as unwanted nucleation centers during the production of high-quality grains using $\alpha$-$Al_2O_3$, or as layers or films based on the said oxide. Hence, the modes of preparation of the xerogel used to date require that the unwanted nucleation centers be excluded from the process of preparation of the sol and from the transformation. Separation of the non-peptizable particles is most frequently performed in ultracentrifuges. Another important feature of these known procedures is the subsequent high-temperature processing of the xerogel to remove the bound water, to ensure phase transformation to a stable modification of $\alpha$-$Al_2O_3$ and a sintering process to obtain ceramic grains, films and layers, which is most frequently performed at temperatures of approximately 1,500-1,600° Celsius. Also boehmite has been known to be used in the regulation of the properties of dyes and paints, in which sol-gel transformation triggered by the change of pH in the alkali setting can occur.

According to the invention, non-peptized boehmite particles in the sol, which have been described as being unsuitable to date, are advantageously used as nucleation centers for the controlled growth in the size of the primary particles of the xerogel. The effect of the use of the non-peptized particles manifests in that it enables the reduction of the quantity of the inorganic acid in the sol and virtually eliminates the ecological burden. The content of the non-peptized particles, along with the size of the primary particles of the xerogel, can be used to control the reverse transformation of the xerogel to gel upon interaction with water. Furthermore, the size of the primary particles of the xerogel can be controlled during the drying of the gel also by the beneficial parallel interaction of the gel with the particles of the raw materials contained in the pelletization mixture or soil, with the particles of silicates and alumosilicates or also by adding modification additives. According to the invention, the controlled transformation of the sol results in the formation of a gel at the surface of solid particles present in the composition or on the surface of particles of soil, as will be described later on.

A composition of the invention comprises a clay, wherein said clay preferably contains clay mineral selected from the group essentially consisting of kaolinite, halloysite, dickite, nacrite, illite, montmorillonite (smectites) and vermiculite. Furthermore, a composition provided herein comprises a raw material. Raw materials comprise fibrous raw materials and inert raw materials. Various fibrous materials can be used in a composition provided herein, either natural or synthetic fibrous materials. In one embodiment, a natural fibrous material is selected from the group essentially consisting of straw, sawdust, dried grasses and plants, sugar beet slices, chicory, needles, cotton and wool. In another embodiment, a composition comprises a synthetic fibrous material, preferably a fibrous material is selected from the group essentially consisting of cellulose fibers, polymeric and organic fibers and felts, fibers and cottons based on aluminum oxide, silicon dioxide and kaolin. Also, mixtures of different types of raw fibrous materials, be it natural or synthetic, can be used. Inert raw material can for example be selected from the group essentially consisting of zeolite, attapulgite, perlite, wollastonite, quartz, zircon, mica, pyrophyllite, talc, serpentine, feldspar, periclase, corundum, haematite, ilmenite, rutile, anatase, perovskite, hydroxides (brucite, gibbsite, diaspore, goethite, lepidocrocite, limonite), carbonates (calcite, magnesite, siderite, dolomite, aragonite), phosphates (apatite) and sulfates (gypsum, anhydrite), or a combination thereof.

As said, current procedures for controlling a sol-gel transformation involve destabilization of the sol by a change in pH after adding monobasic or polybasic acids. However, for a composition according to the invention, a low pH of the gel is undesirable because of its negative effect on the seed germination and plant growth. Advantageously, according to the invention, a gel is obtained by the destabilization of the sol by a change in the electrically repulsive forces in the sol. These changes can be induced by the presence of the admixtures of water-soluble salts in clay and in raw materials and also by the presence of ions (movable in water) adsorbed on the surface of particles or aggregates of particles of the raw materials present in a composition according to the invention. It is believed that the clay particles and the raw materials (both fibrous and inert) gradually release ions in the aqueous setting, changing both the character and the concentration of electrolytes in the aqueous setting of the sol. It is believed that these changes are localized and predominantly occur in the near vicinity of external surfaces of particles of the raw materials. Accordingly, these changes result in a gradual change in the size of in particular electric repulsive forces within the fourth component, preferably between the particles of the sol of boehmite. Consequently, a local change in pH occurs. The gradual controlled destabilization of the sol by means of controlling the speed of addition of the boehmite sol to the other components of the composition and its concentration enables control over the process of gelatinization. When preparing a composition according to the invention, the speed and the localization of gel formation of a fourth component, preferentially at the external surface of particles, can be controlled. Moreover, at the same time, the invention allows for adjusting the pH of the pellet or of the soil to values suitable for seed germination and/or plant growth. An additional advantage is that the gel preferentially is formed at the external surfaces of the particles, which is caused by the thickening of the sol resulting from the suction of water by the particles of the raw materials across the primarily formed gel layer.

In a preferred embodiment of the invention, the control of destabilization of the sol is further extended by providing a composition which additionally comprises colloidal silica. Sometimes referred to as a sol or silica sol, colloidal silica consists of a stable dispersion of amorphous silica particles. To achieve this, the silica particles should preferably be small enough such that they are largely unaffected by gravity. Therefore, silica particle sizes are usually of the order of less than 100 nanometers. Colloidal silica's can be manufactured from materials such as sodium silicate. The use of colloid solutions of silicic acid in water is well known for the production of facade, silicate-based paints against corrosion, bindings used for fire-proof brickworks, protective coatings for organic surfaces and for the production of non-flammable surfaces of materials, binding agents, and glues for the mutual connection of different components. Silica sols are also used for the fixation of heavy metals and radioactive wastes in the water with different chemical treatments. Preferentially, a composition according to the invention comprises (a colloid solution of) silicic acid stabilized by alkali or ammonium, or a colloid silicon dioxide treated with aluminum or an other modifying additive such as humic acid and humates, nitrates, phosphates and sulfates, in particular of $Na^+$, $K^+$, $NH_4^+$, $Ca^{2+}$, $Mg^{2+}$. Preferably, a silica sol, silicon dioxide, or a combination thereof substitutes for 0.1 to 90 percent of the boehmite fourth component by weight.

The extended mode of controlled destabilization of the sol consists, according to the invention, in the aforementioned interaction of the sol with the raw materials in combination with the parallel interaction of the sol with the added modifying admixtures. Hence, production of a composition according to the invention is based on a controlled transformation of the sol to the gel and advantageously allows to use multilevel control of the speed of gelatinization, quantity of the gel being formed, localization of the gel and pH of the final pellet or soil during the pelletization process or preparation of the soil.

In many cases, pesticides (such as fungicides, herbicides, and others) are added to pellets and soils to offer growing plants protection, e.g., against pests and weeds. These substances can, for example, sublime and/or are soluble in water, and thus they are typically added in relatively high quantities to obtain pellets or soil with the required concentration of a pesticide. In one embodiment, a composition according to the invention additionally comprises a pesticide. It was found that a composition according to the invention wherein a fourth component is in the gel or xerogel form can be used advantageously to reduce the actual dose needed to achieve the required quantity of pesticide in a pellet or soil. Pesticides or other protective substances do not need to be added in high concentrations to the initial mixture. Rather, they are simply absorbed by the gel or onto the surface of xerogel particles. Thus, a composition comprising an effective concentration of pesticide can now be obtained by adding less pesticide, thereby reducing the negative impact of pesticides on the environment. In a further embodiment, a composition additionally comprises a fertilizing compound.

The water transport capacity of existing pellets or soils has been determined largely by the imbibition capacity of the raw material present in the pellet or the soil, as well as by the capillary suction of water through open pores. According to the invention, the foregoing modes of water transport in a composition, such as a pellet or soil, are supplemented and extended with a novel mode of water distribution. In one embodiment, a composition according to the invention is characterized in that the fourth component can form a gel or is in the gel-form. In a preferred embodiment, a fourth component in a gel form, preferably a boehmite-gel, is dried to form a xerogel. A xerogel essentially refers to a gel from which all free liquid has been removed. A fourth component in the dried xerogel form can preferably undergo a reverse change to normal gel and sol upon contact with water, and thus the xerogel films form excellent means of distributing water throughout the volume of the pellet and/or soil. An advantage of a fourth component capable of forming a reversible xerogel consists in that the speed of transport can be controlled by the thickness and size of the particles of the xerogel. The effect of using a xerogel consist in that the total content of the water absorbed by the pellet or soil can be controlled to a large extent, essentially irrespective of the climatic conditions.

However, as will be discussed in detail below, a composition comprising a fourth component wherein said fourth component can form an irreversible xerogel can be produced by addition of modifying additives, e.g., silica sol, thereby rendering the composition unable to undergo reverse change after being dried. Such an irreversible xerogel is advantageously used under extremely wet climatic circumstances in order to minimize or avoid oversaturation of the pellet, soil or seed-pellet with water.

The mechanic properties of a pellet, in particular cohesiveness and mechanical strength, have traditionally been modified by variation of the content of clay in the pelletization mixture, by addition of inorganic binding agents (such as plaster) or by addition of glues, most frequently based on organic or polymeric substances. An increase in mechanical strength of a pellet obtained using known methods typically comprises increasing the compactness of a pellet, resulting in a reduced porosity and a reduced water absorption capacity of the pellets. Another drawback of achieving mechanical strength by increasing the clay content or other conventional means, is that it increases the resistance of the pellet against the growth of the germ, thus slowing down the growth of a plant from a seed.

According to the invention, the foregoing adverse phenomena are in essence eliminated by the provision of the composition of the invention comprising a fourth component which is able to form a xerogel. The principle of using a xerogel consists in that the drying of the gel films at the surface of particles and at the interface between the particles results in a strong binding of the particles by the xerogel, thus increasing the mechanical strength of the dried composition. The strength value can be measured in the dried pellet. Usually, the strength of a pellet is determined by the xerogel and the clay present in the pellet. It was observed that the presence of xerogel in the pellet increases the strength (pressure) needed for the destruction of the pellet compared to a xerogel-free pellet. This increase in the strength is believed to indicate increased mechanical stability. In one embodiment, a composition with a xerogel is provided, wherein the pressure needed for its destruction, indicative of its mechanical stability, is most often 10 Newton or more.

In a preferred embodiment, the interaction of the xerogel with water results in the reverse change of the xerogel to normal gel and sol, causing a reduction in the mechanical strength of a wet pellet and herewith a reduced resistance of the pellet against the growth of the germ. The effect of the use of the AlO(OH) xerogel alone or in combination with the addition of modifying additives, which make it irreversible, preferentially colloid solutions of the silicic acid stabilized with alkali or ammonium and of the colloid silicon dioxide adjusted with aluminum, is that the mechanical properties of the pellets or soils in dry or wet state can be controlled to a large extent, as can be the resistance of the pellets or soils against the growth of the germ, without having to change the composition of the raw materials of the mixture or of the soil.

An additional advantage of a composition as provided is that its constituents are close to nature. In fact, they are essentially part of nature (boehmite, silicates —$SiO_2$ and alumosilicates $SiO_2$—$Al_2O_3$). Therefore, in contrast to conventional pellets and soils comprising glues or other synthetic additives or binders, a composition provided herein represents less ecological burden for the environment.

Transport of oxygen by a pellet (or soil) and the amount of oxygen in the pellet have been difficult to control. They have been determined in particular by the open porosity and the water saturation of the pellet. Existing literature reports that with the decrease in the open porosity of the pellet and with the increase of the water saturation of the same, a significant decrease in the oxygen content in a wet pellet occurs rapidly (within tens of minutes) compared to the dry pellet, i.e., to 25-45% of the original value. Upon full saturation of the pellet with water, the content of oxygen can be close to the content of oxygen which is dissolved in the water. A change in the composition of raw materials of the pelletization mixture is often used to increase the open porosity of the pellet, however such a change primarily results in an increased overall imbibition capacity of the pellet for water. The oxygen content in the wet pellet need not be significantly effected.

Surprisingly now, the invention (use of AlO(OH) xerogel) appears to facilitate the transport of the gaseous phase and dramatically increases the content of the oxygen in the pellet or soil. An advantage of a composition according to the invention comprising a fourth component which can form a xerogel, preferably a reversible xerogel, is that the highly porous texture of the composition remains preserved, while the speed and mode of the water transport by the composition, as well as its total water imbibition capacity, are regulated. This leaves more space for the transport of the gaseous phase. In a preferred embodiment, a composition comprises a clay, a raw fibrous material, an inert material and boehmite as a fourth component, wherein said boehmite contains non-peptized particles. The use of the non-peptized particles of the boehmite for the controlled growth of the primary particles of the xerogel results in the formation of non-clarified xerogels containing air enclosed in their pores, in the manner as per the invention. The pores are capable of gradually releasing air during the reverse change of the xerogel to the sol, thus contributing to the content of oxygen in both the wet and water-saturated pellet. The gel, being formed upon the initial interaction of the sol with the particles of raw materials, wraps in particular the external surface of the particles, enclosing the gas in the internal pores of the particles. During the reverse change of a xerogel to sol, the air (oxygen) once enclosed will be gradually released from the internal pores of the particles and thereby also contribute to the content of oxygen in wet and water-saturated composition. The effect of the use of a xerogel alone or in combination with modifying additives, preferentially colloid solutions of silicic acid stabilized for instance with alkali or ammonium, or colloid silicon dioxide, consists in that the xerogel enables the maintenance of the high content of oxygen not only in the wet but also in the water-saturated pellet or soil with 60-90% of the original oxygen content in the dry state of the pellet for a long time (up to dozens of hours). Provided is a composition comprising a fourth component that is capable of forming an reversible or irreversible xerogel, wherein the oxygen content of a water-saturated composition (comprising the xerogel) lies within the range of at least 60% of the oxygen content of that same composition in dry condition. A high oxygen content in a composition according to the invention has a positive influence on the germination capacity of seeds.

In one embodiment, a seed pellet (which may have any shape or appearance, e.g., a tablet) comprising a composition according to the invention is provided. In another aspect, the invention provides an improved soil, or another type of medium, for growing a plant comprising a composition according to the invention. It has been found that the composition according to the invention can function as a soil improver. The composition can be added as such, either as sol or as (xero)gel, or in the form of pellets or tablets. It is also possible that a sol or gel of boehmite on its self, without a clay or raw materials, is added to the soil. Upon addition of the soil improver the soil structure is enhanced and the aeration is improved. A heavy soil, such as a heavy clay soil, can for instance be mixed with a composition having a porous structure to form a top layer with increased permeability for water and gases. With its improved structure, an improved clay soil according to the invention is easier to cultivate, increases water and oxygen availability to plants, improves drainage and promotes strong, healthy root growth.

Plant growth and yield are to a large extent dependent upon soil water dynamics. If the soil is too dry, plant growth is limited and yields are reduced. On the other hand, if the soil is water-saturated the roots of most plants cannot breath and yields will suffer. Optimal seed germination requires a moist but certainly not wet environment. Traditional modification of properties of pellets and soils for various climatic conditions (dry, medium or wet) have been undertaken in particular by changing the composition of the raw materials of the pelletization or soil mixture, which requires the use of different mixtures to produce optimal compositions for each of the conditions. The invention now eliminates the limited use of a single composition of raw materials of the mixture for various climatic conditions by using the AlO(OH) xerogel either alone or in combination with the modifying additives. The xerogel alone or with the admixture of modifying additives can be used to change, in a controllable manner, the speed of water imbibition, the overall water imbibition capacity of the composition, preferably within the range of 30-300%, the open porosity of the pellets, preferably within the range of 30-80%, the mechanical properties and the content of oxygen in the pellet of a single type of pelletization mixture. In this manner, the properties of a composition can be modified in accordance with the climatic conditions of the place of destination of the composition by changing or adapting a fourth component, without having to change the raw materials in the composition. The effect of the use of the xerogel then manifests itself in that it extends the potential of use of a single composition of raw materials of the mixture for different climatic conditions, simplifying the manufacturing technology of the pellets in general and enabling the modification of the properties of soils in accordance with local climatic conditions. Thus, a soil improver comprising a boehmite sol or gel or a composition according to the invention, and use of the same, allows to optimize soil characteristics according to the local situation. The dosage of a composition that needs to be mixed into the soil will in general depend on the type of soil to be improved and on the properties of the composition.

A composition according to the invention can be produced by mixing a clay, a fibrous material, an inert material, a fourth component comprising a cation selected from the group consisting of Al, Zr and Ti and an anion selected from the group consisting of oxyhydroxide, oxychloride, nitrate, sulfate, chloride, hydroxide and alkoxide, and optionally silica sol or colloid silicon oxide or other additives, and optionally further comprising drying said mixture. The fourth component is preferably added within the range of 0.1-40 w % in the form of a sol, with the concentration of the fourth component ranging from 0.1-70 w % to the pelletization mixture (clay, fibrous and inert raw materials). The composition preferably further consists of 20-50% clay, 0-70% fibrous materials, 0.1-80% inert material and a fourth component. 0-90% of said fourth component may be replaced by additives, such as silica sols.

In a further embodiment, the invention provides a method for producing pellets, said method comprising mixing the components of a composition according to the invention, preferably in the presence of water, and putting said mixture in a pelletizer, allowing the fourth component in said mixture to form a gel and drying said gel to form a xerogel. A suitable pelletizer for producing pellets according to the invention comprises a centrifugal pelletizer, consisting of a rotating drum that contains circumferential holes. It typically comprises a rotating iron or stainless steel drum in which an amount of seeds is placed, and wherein composition and/or water is either continuously or non-continuously dosed during a certain period of time. The rotation creates spherical pellets. The drum speed, batch time and powder/liquid dosing are adjustable. However, other types of palletizes can also be used. The type of pelletizer used determines the size and shape of the pellets produced. Most modern pelletizers are large, enclosed, fully automated systems, where the pellet flow is controlled within the pelletizer. In the prior art, the speed of seed pelletization and yield of the pellets of the required size obtained in the pelletization process is controlled in particular by the composition of the raw materials of the pelletization mixture, especially by the content or addition of clays, and by the addition of glues, and also by the quantity of water and/or pelletization mixture added, time of pelletization of a single additive and number of revolutions of the pelletizer. The acceleration of the prior art pelletization process, achieved for example by increasing the content of clay in the mixture or by increasing the number of revolutions of the pelletizer manifests as a change in the density which influences the transport capacity and germination properties of the pellets.

According to the invention, surprisingly, also the pelletization process is accelerated and the yield of pellets is increased as a result of addition of a fourth component, preferably boehmite, to a pelletization mixture comprising a clay, a fibrous material and an inert material. Said fourth component induces the adhesion and binding during the pelletization both between the particles and to the surfaces of the seeds, while no change in the composition of the raw materials contained in the mixture is required. The formation of the gel films results in a homogeneous structure in the pellet, or in other words, in the increased uniformity of properties throughout the volume of the pellet. At the same time, while the time of pelletization is reduced, yield is increased, and it has proven possible to pellet the seeds with smoother surfaces as well to pellet the final products, seed pellets, to larger diameters. As is exemplified herein, the pelletization time of a conventional pelletization mixture comprising clay, fibrous material, inert material and water, was 24 minutes. Surprisingly, when the fourth component (boehmite) was added to this mixture, the pelletization time was reduced to 18 min. Moreover, the addition of the fourth component increased the total pellet yield. Thus, a method for producing pellets according to the invention is faster and more efficient when compared to existing pelletization procedures.

Further provided is a method to grow a plant from seed, comprising sowing a seed pellet and allowing the plant to grow. A seed pellet can be put into soil or a plant growth medium, either manually or mechanically. The mechanical strength or resistance of conventional seed pellets is often insufficient to withstand vigorous handling. During mechanical sowing, which is often the preferred choice in order to reduce labor and save time, traditional pellets often break up. In contrast, seed pellets comprising a composition according to the invention are in general sufficiently resistant to external forces encountered, not only during handling or storage of the pellets, but also during mechanical sowing.

The diameter of the pellet can be adjusted to the size required for automatic sowing machines. For vegetable pellets, this diameter lies in the range from 1-6 mm. For sugar beet pellets, the diameter lies, in particular, in the range from 3.5-5.5 mm in Europe and 2.5-6 mm in the USA.

A composition wherein the fourth component also comprises a modifying additive, preferably silica sol, silicon dioxide, or a combination thereof, is the preferred choice for seed germination or plant growth under extremely wet conditions. As said before, upon gelatinization and drying of the fourth component containing one of these silica admixtures, an irreversible xerogel is formed and the water adsorption capacity of a dried composition comprising such a fourth component is decreased. In contrast to conventional pellets or soil, the new composition does not become oversaturated with water because of the open structure and the porosity of the composition. Both pellets and soils comprising a composition including a silica sol can be used to improve growth of a plant in a wet soil. For instance, a wet soil or at least the top layer of a wet soil can be mixed with a composition, followed by putting seeds in the improved soil.

In a further aspect of the invention, seed germination is improved by contacting a seed with a composition according to the invention and adding a sufficient amount of water and nutrients. Depending on the climatic conditions, and on the type and quality of seeds, a composition according to the invention improves the total germination capacity of pelleted seeds by 0.1-20%.

In a further aspect of the invention, a potted plant with a growth medium can be produced, said method comprising putting a composition according to the invention in a pot and planting a plant therein. Of course, for optimal growth of the potted plant is it desired to regularly water the plant and add nutrients.

In another embodiment, a pot-less plant with a growth medium is made, said method comprising putting a composition according to the invention in a mould or an other type of removable container, planting a plant therein and removing said mould. Also here, the plant should preferably be provided with water and optionally with plant nutrients. In fact, a composition according to the invention is advantageously used as a compact soil substitute, allowing for the production of plants which can be handled, stored or sold without a pot. Such a pot-less plant obtainable by a method according to the invention, is easier to handle and can be directly planted in the soil, without the need for removing the pot first. Thus, this will allow a time gain in the planting out of plantlets.

As discussed above, a composition according to the invention comprising a clay, a fibrous material, an inert material and a fourth component, allows to improve or optimize the properties of pellets and soils. The improved characteristics allow to adapt the growth of the xerogel particles during the drying of the gel to the xerogel; to influence the course of the pelletization process; to generate a reversible change of the xerogel to gel or sol upon contact with water; to increase the mechanic properties of the pellets and soils in either dry or wet state, including lowering the resistance of moist pellets and soils to the growth of the germ; to increase rates of water absorption, total absorption of water by the pellet or soil and open porosity of the pellet or soil; to increase total oxygen content in moist and water-saturated pellets and soils and increased maintenance of said higher content; to increase the speed of germination and total germination capacity of seeds; the application of pellets of identical composition of raw materials in different climatic conditions and of soils for local climatic conditions without any negative impact on the ecology; allow to generate pot-less plants and allow for the addition of substances for the protection of seed and plants.

The following examples illustrate the mode of modification of the pelletization technology and of the properties of the pelletization mixtures, pellets and soils for seed germination and plant growing, without limiting the extent of use.

Example 1

Pellets made from a conventional water-pelleted mixture containing 23 wt % clay, 67 wt % fibers, and 10 wt % inert materials showed a total absorption of water $WA_{total}=170\%$, an open porosity AP=61% and F=9N for the pressure needed for the destruction of the pellet.

When using sol with 3 wt % of AlO(OH) as a fourth component during the pelletization of the mixture with the same content, a composition according to the invention was obtained. The total absorption of water by a composition of the invention decreased to $WA_{total}=155\%$, and the pressure increased to F=20 N while the open porosity remained approx. the same AP=58%.

Example 2

The increase in the mechanical strength of the pellet to F=32 N, achieved by increasing the content of clay to 37 wt % and by decreasing the content of fibers to 53 wt % in the composition as per example 1, resulted in the values $WA_{total}=103\%$ and AP=38%.

When using sol with 5% AlO(OH) during the pelletization of the mixture having the content as per example 1, the total absorption of the water $WA_{total}$=119%, and pressure F=28 N were achieved with open porosity AP=51%.

Using sol with 5% AlO(OH) in combination with the addition of 2% colloid solution of silicic acid stabilized by alkali during the pelletization of the mixture having the same content as in example 1 resulted in $WA_{total}$=105%, pressure F=30 N and open porosity AP=49%.

Example 3

Dispersion of boehmite at 65° C. was used to prepare a suspension containing 30 wt % boehmite. A 5% aqueous solution of nitric acid was gradually added to the suspension. From the sol obtained, non-peptized particles of boehmite were removed by centrifugation. After having removed the excess water by evaporation using constant mixing at 70° C., the sol was converted to gel. When adding 10% ethyl alcohol to the suspension and removing the non-peptized particles by centrifugation followed by gelatinization with 15% citric acid solution, the gelatinization occurred as soon as during the mixing. The gel was dried and used to prepare a compacted clarified xerogel with the size of particles $d_{50}$=27 nm.

In a sol containing 25% boehmite and 10 wt % of non-peptized particles, gelatinization occurred shortly after mixing boehmite with water; and following the drying process, a clarified porous gel was prepared having the size of particles $d_{50}$=80 nm.

In a sol containing 15 wt % boehmite and 8 wt % of non-peptized particles, the subsequent combined gelatinization induced by gradual adding of the modifying admixture 14% of the mixed solution containing sodium humate, potassium nitrate, and sodium phosphate, occurred during the mixing, and following the drying process, a non-clarified porous xerogel was prepared having the size of particles $d_{50}$=67 nm.

In a sol containing 10 wt % boehmite with 12 wt % of non-peptized particles in combination with the gradual addition of clays and raw materials, gelatinization occurred very quickly during mixing, and following the drying process, a non-clarified porous xerogel was prepared having the size of particles $d_{50}$=90 nm.

In a sol containing 5 wt % boehmite and 6 wt % of non-peptized particles in combination with gradual addition of the mixture of inert raw materials (perlite (60 wt %), atapulgite (15 wt %), zeolite (15 wt %), siderite (5 wt %) and hematite (5 wt %)), gelatinization was completed during mixing, and following the drying process, a porous xerogel was prepared.

In a suspension containing 9 wt % boehmite with 14 wt % of non-peptized particles in combination with gradual addition of the colloid solution of the silicon dioxide adjusted with aluminum, gelatinization occurred during mixing, and following the drying process, a porous xerogel was prepared.

Example 4

When using the mixture containing 30 wt % clay, 50 wt % calcite (limestone), 10 wt % talc, 5 wt % gibbsite, and 5% rutile, the total absorption of water was $WA_{total}$=205% of the used prepared mixture of specified raw materials.

When using a sol containing 2.5 wt % of AlO(OH) in the mixture of the same content, the total absorption of water was $WA_{total}$=183%.

Example 5

In a mixture containing 52 wt % fibers, 34 wt % clay and 14 wt % inert raw materials, the pH of the aqueous suspension was pH=6.1 and the total absorption was $WA_{total}$=151%. The mixture was used for the germination of seed, the extract of which in water had a pH=7.2. The germination capacity of the seed after 10 days was 89% at 20° C. with 60 g water.

When using sol containing 3 wt % boehmite in combination with the addition of a modifying mixture of silica sol stabilized with alkali and potassium phosphate as a fourth component, the pH of the aqueous suspension of the same composition was adjusted to pH=7.2, with water absorption $WA_{total}$=131% and 10-day germination 94%.

Example 6

In a mixture containing 60 wt % fibers, 25 wt % clay and 15 wt % of inert raw materials, the pH of the aqueous suspension was pH=7.3. and the total with water absorption was $WA_{total}$=170%.

When using sol containing 5 wt % boehmite, the pH of the aqueous suspension of the same composition was adjusted to pH=6.5 with water absorption $WA_{total}$=144%.

Example 7

From a sol containing 32 wt % boehmite, thin layers of xerogel having the thickness of approximately 500 nm were prepared by drying. Samples of xerogel of approximately 50 mm in length and 8 mm in width were exposed to contact with water on one side and the time needed for the transfer of water alongside the sample to the other side was measured ranging 9-17 sec. The transport of water is accompanied by a gradual reverse change of the xerogel to the sol.

Example 8

Particles of bentonite were pelleted by water or by sol containing 2% boehmite and non-peptized particles, the mixture was homogenized and dried at 100° C. After drying, the aggregates of particles were stirred into the powder and the powder was used to prepare layers of identical thickness and weight for the measurement of water absorption rate. The quantities of water or sol added to the bentonite and the water absorption values measured in different time intervals are shown in the following table. The sol accelerates the absorption and transport of water by the layer of powder in the initial phase of the interaction between the dry mixture and water, but decreases the total water absorption.

|  | Time (min) | | | | | | |
| --- | --- | --- | --- | --- | --- | --- | --- |
|  | 0 | 2 | 5 | 10 | 15 | 20 | 60 |
| Water absorption | WA(%) | WA(%) | WA(%) | WA(%) | WA(%) | WA(%) | WA(%) |
| Bent. + 0.66 ml water | 0 | 206.0 | 331.0 | 405.0 | 462.9 | 519.8 | 520.9 |
| Bent. + 0.66 ml sol | 0 | 211.2 | 351.3 | 437.2 | 481.2 | 516.3 | 517.2 |
| Bent. + 0.80 ml sol | 0 | 248.7 | 375.1 | 435.8 | 462.8 | 508.9 | 509.7 |

-continued

|  | Time (min) | | | | | |
| --- | --- | --- | --- | --- | --- | --- |
|  | 0 | 2 | 5 | 10 | 15 | 20 | 60 |
| Bent. + 2.1 ml sol | 0 | 252.1 | 398.6 | 438.6 | 465.1 | 502.6 | 503.1 |
| Bent. + 2.5 ml sol | 0 | 269.6 | 408.2 | 452.0 | 466.0 | 490.5 | 491.6 |

Example 9

Particles of bentonite were treated in the same way as in example 7, except that drying proceeded at 60° C. after the homogenization of the particles. The powders prepared were examined by X-ray diffraction measurement. The results are shown in FIG. 1. There were no significant differences between the X-ray diffraction patterns of all samples measured. The interaction of the sol with bentonite under the condition of the pelletization process, resulted in no significant changes in the structure of bentonite and the gel is preferentially located at the external surface of the particles or aggregates of particles of bentonite.

Example 10

Sugar beet seeds (100 g) were pelleted using the mixture of the composition as in example 1 with water or sol containing 3% boehmite and non-peptized particles. The time of the first pelletization for the preparation of pellets having the diameter 3.75-4.5 mm was 24 minutes for water with a yield of 67% and 18 minutes for the use of sol with a yield of 78%. After having separated the smaller and larger diameters of the pellets, a second pelletization of the sorted smaller pellets was performed. The total time of the pelletization with water was 41 minutes, with a total yield of 85%, and 29 minutes with 94% total yield for the sol.

Example 11

Figure 2:
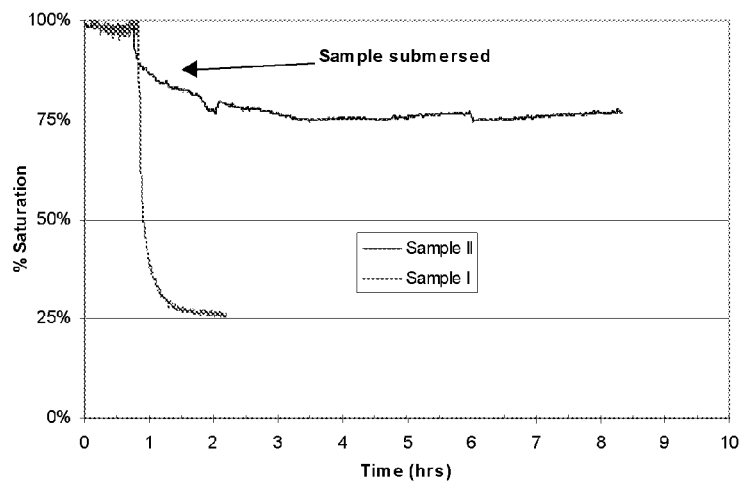
FIG. 2: A mixture of raw materials as per example 1 was treated with water (sample I; upper curve) or with a sol containing 2% boehmite and non-peptized particles (sample II; lower curve). The prepared layers were dried and the content of oxygen in the geometrical center of the layer was determined using an oxygen probe. Thereafter, the oxygen content was determined while the layers were submersed in water.

A mixture of raw materials as per example 1 was treated with water or with a sol containing 2% boehmite and non-peptized particles. The prepared layers were dried and the content of oxygen in the geometrical center of the layer was determined using an oxygen probe obtained from TNO, The Netherlands. In the dry state, virtually identical oxygen content was found in both layers, which was defined to be 100%. Following the water saturation of the layers, as shown in FIG. 2, a substantial decrease of the oxygen content up to 25% of the initial value of the dry layer occurred in the water-treated layer (I) in approximately 40 minutes. In the layer treated with the boehmite sol (II), the oxygen content decreased to 75% of the initial value in approximately 120 minutes and remained constant during the entire measurement for additional 6 hours, when the experiment was completed.

Example 12

To ensure the content of 20 g fungicides in the pellets, the addition of 21.4 g fungicide was required during the preparation of the pellets. When adding the sol containing 3 wt % boehmite in the same mixture, the dosage required was reduced to 20.5 wt %.

Example 13

Figure 3A:
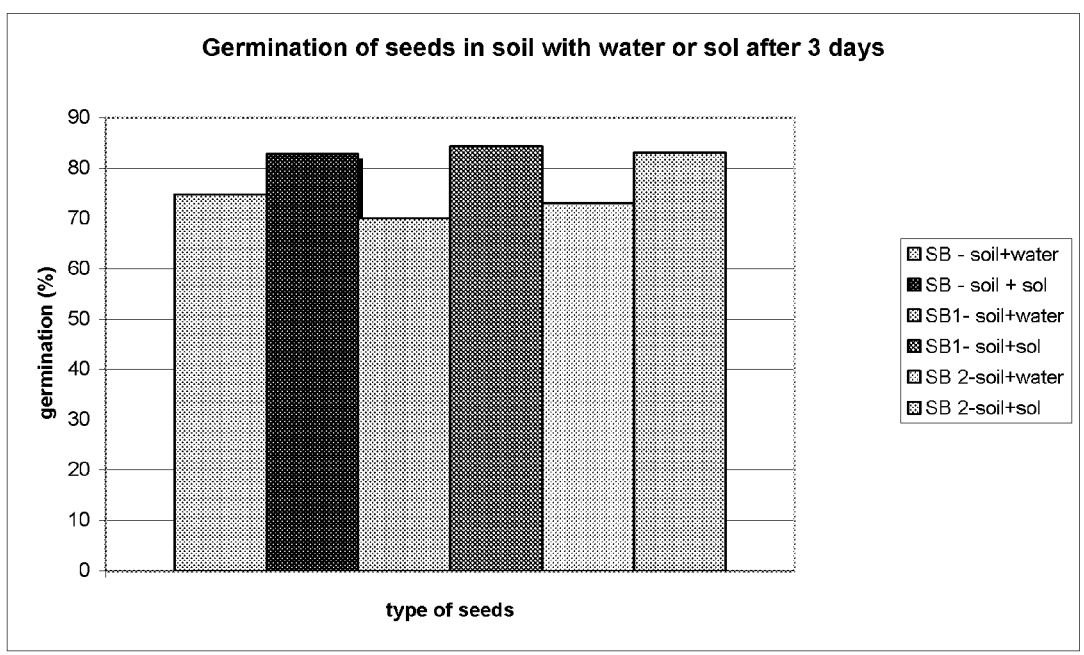
FIG. 3: Germination of sugar beet seeds in clay soil treated with an amount of water (soil+water) or with an identical amount 2% boehmite sol (soil+sol). Three different types of sugar beet seeds, SB, SB1, and SB2 were sown. The germination capacity was evaluated after 3 (panel A), 7 (panel B) and 10 (panel C) days under the conditions corresponding to wet climatic conditions (60 mL water, temperature 20° C.).
Figure 3B:
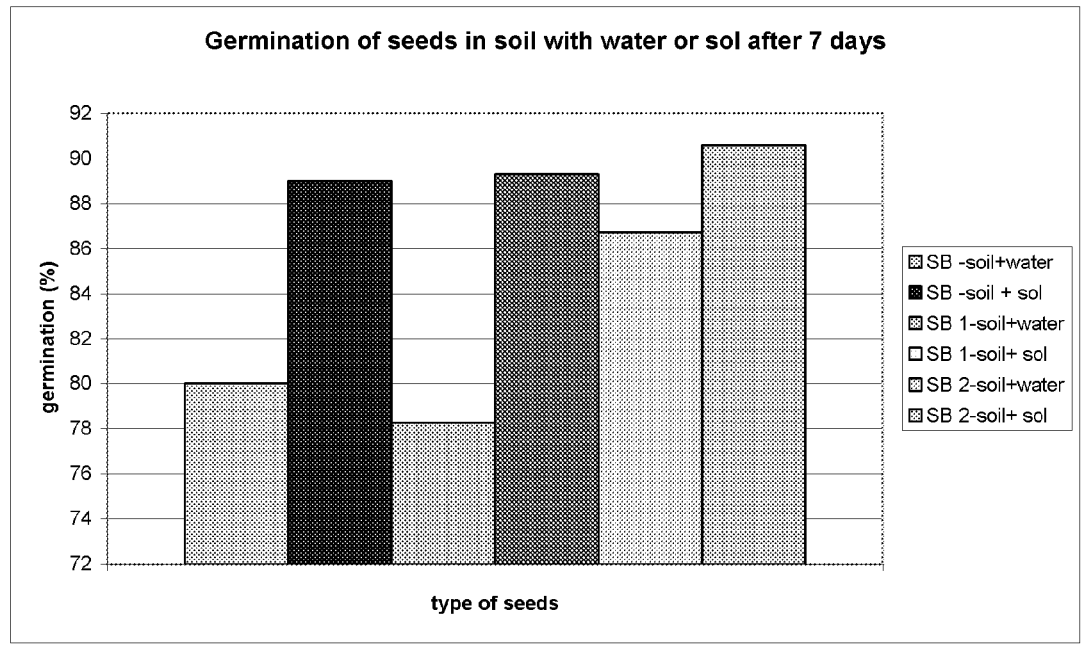
Figure 3C:
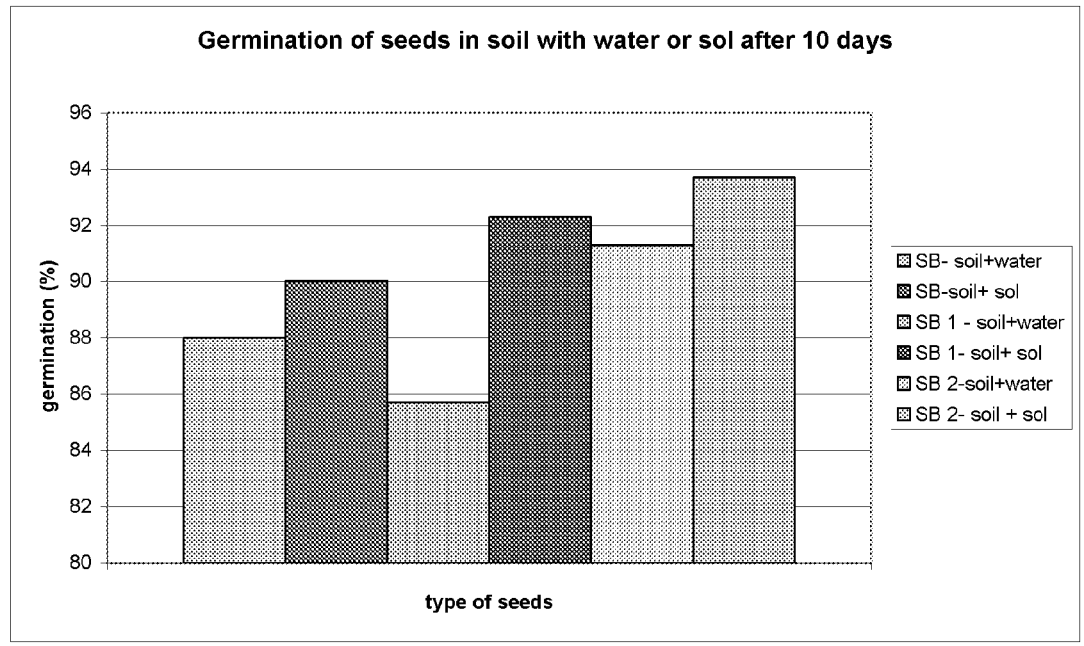

Clay soil was treated with an amount of water or with an identical amount 2% boehmite sol. Three different types of sugar beet seeds, SB, SB1, and SB2 were sown. The germination capacity was evaluated after 3, 7 and 10 days under the conditions corresponding to wet climatic conditions (60 mL water, temperature 20° C.). The results are shown in FIGS. 3 A, B and C.

Example 14

The seeds SB2 were pelleted using a pelletization mixture with water (1–mix+water) as specified in example 5 or with the identical amount of sol (2–mix+sol). In addition, the seeds were pelleted using mixtures containing additional sol, with the amount of sol higher by 13% (3–mix+sol 13) or 27% (4–mix+sol 27), respectively, than the amount of sol used in the previous pelletization.

Figure 4:
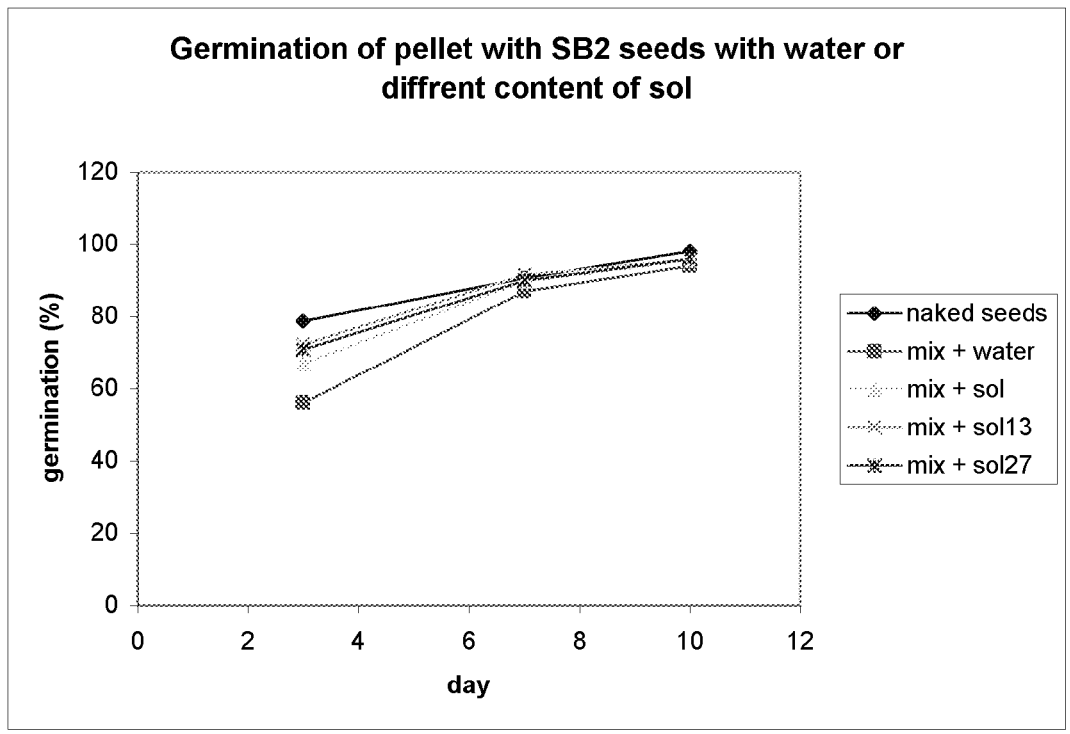
FIG. 4: Germination of pellet with SB2 sugar beet seeds pelleted using a pelletization mixture with water (mix+water) as specified in example 5 or with the identical amount of sol (mix+sol). In addition, the seeds were pelleted using mixtures containing additional sol, with the amount of sol higher by 13% (mix+sol 13) or 27% (mix+sol 27), respectively, than the amount of sol used in the previous pelletization.

The germination capacity was evaluated after 3, 7 and 10 days under the conditions corresponding to approximately medium climatic conditions (35 mL of water, temperature 20° C.). The results are shown in FIG. 4.

The invention claimed is:

1. A method for producing seed pellets, said method comprising forming a mixture comprising a clay, an inert material, and an additional gel forming component being a cation of aluminum, zirconium or titanium and an anion of oxyhydroxide, oxychloride, nitrate, sulfate, chloride, hydroxide or alkoxide, and wherein the concentration of said additional gel forming component ranges from 0.1 to 70 percent by weight (w %) of the total weight of the clay, and the inert material, adding this mixture to a pelletizer including seeds, allowing the additional gel forming component in said mixture to form a gel, and pelletizing the seeds with the mixture to form seed pellets including drying said gel to form a xerogel.

2. The method of claim 1 wherein said mixture further includes a fibrous material.

3. The method of claim 2 wherein the fibrous material includes natural fibrous material.

4. The method of claim 3, wherein the natural fibrous material includes straw, sawdust, dried grasses and plants, sugar beet slices, chicory, needles, cotton or wool.

5. The method of claim 2, wherein the fibrous material includes synthetic fibrous material.

6. The method of claim 5, wherein the synthetic fibrous material includes cellulose fibers, polymeric and organic fibers and felts, fibers and cottons based on aluminum oxide, silicon dioxide or kaolin.

7. The method of claim 1 wherein the additional component includes boehmite.

8. The method of claim 1 wherein the mixture includes 20-50 w % clay, 0-70 w % fibrous material, and 0.1-80 w % inert material.

9. The method of claim 1 wherein the additional component includes silicic acid, colloid silicon dioxide, or a combination thereof.

10. The method of claim 9 wherein the silicic acid, colloid silicon dioxide, or a combination thereof is present in a concentration of 0.1 to 90 percent by weight of the additional component.

11. The method of claim 1, wherein the clay includes kaolinite, halloysite, dickite, nacrite, illite, montmorillonite, smectites, or vermiculite.

12. The method of claim 1, wherein the inert material includes zeolite, attapulgite, perlite, wollastonite, quartz, zircon, mica, pyrophyllite, talc, serpentine, feldspar, periclase, corundum, haematite, ilmenite, rutile, anatase, perovskite, brucite, gibbsite, diaspore, goethite, lepidocrocite, limonite, calcite, magnesite, siderite, dolomite, aragonite, apatite, gypsum or anhydrite.

13. The method of claim 1, wherein the mixture further includes a fertilizing compound.

14. The method of claim 1, wherein the mixture further includes a pesticide.

15. The method of claim 1, wherein the xerogel is a reversible, irreversible, or a partially irreversible xerogel.

16. The method of claim 1, wherein the pellets have a mechanical stability of at least 10 Newton.

17. The method of claim 1 wherein the pellets have a porosity within the range of 30% to 80%.

18. The method of claim 1, wherein the pellets have an oxygen content when saturated with water within the range of at least 40% of the oxygen content of the pellets in a dry state.

19. The method of claim 1, wherein the pellets have a water absorption capacity within the range of 30% to 300%.

* * * * *